United States Patent
Schliwa et al.

(10) Patent No.: US 9,656,751 B2
(45) Date of Patent: May 23, 2017

(54) MODULAR CABIN SEGMENT, CABIN FOR A VEHICLE AND VEHICLE WITH A CABIN

(71) Applicant: Airbus Operations GmbH, Hamburg (DE)

(72) Inventors: Ralf Schliwa, Dollern (DE); Maria Strasdas, Jork (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 15/010,387

(22) Filed: Jan. 29, 2016

(65) Prior Publication Data

US 2016/0144962 A1    May 26, 2016

Related U.S. Application Data

(63) Continuation of application No. 13/968,855, filed on Aug. 16, 2013, now Pat. No. 9,376,211, which is a
(Continued)

(30) Foreign Application Priority Data

Feb. 18, 2011   (DE) .................. 10 2011 011 704

(51) Int. Cl.
   *B64D 11/02*  (2006.01)
   *B64D 11/00*  (2006.01)
   (Continued)

(52) U.S. Cl.
   CPC .............. *B64D 11/02* (2013.01); *A47K 4/00* (2013.01); *B64D 11/0023* (2013.01);
   (Continued)

(58) Field of Classification Search
   CPC ..... B64C 1/30; B64C 1/00; B64C 2001/0036; B64D 11/02; B64D 11/0023; B64D 11/04;
   (Continued)

(56) References Cited

U.S. PATENT DOCUMENTS 4,055,317 A    10/1977  Greiss
5,474,260 A    12/1995  Schwertfeger et al.
(Continued)

FOREIGN PATENT DOCUMENTS

CN    101119892 A    2/2008
CN    101588966 A    11/2009
(Continued)

OTHER PUBLICATIONS

Chinese Office Action Jan. 7, 2015.
Russian Notice of Allowance dated Jan. 14, 2015.

*Primary Examiner* — Blair M Johnson
(74) *Attorney, Agent, or Firm* — Lerner, David, Littenberg, Krumholz & Mentlik, LLP

(57) ABSTRACT

A modular cabin segment for a vehicle includes a first lateral segment module accommodating a first toilet arrangement with a toilet compartment, a second lateral segment module, and at least one central module, wherein in each case an outer lateral face of the first segment module and of the second lateral segment module is designed to adapt in each case to an inner wall of a cabin of the vehicle so as to correspond to the aforesaid. At least one of the modules includes a cabin attendant seat that on one side is held on the at least one module so that it can be pivoted on an axis. In this manner very good integration of many different functions in the manner of a construction kit is achieved in order to be able to accommodate a greater number of passenger seats elsewhere within the limited space provided in a cabin.

14 Claims, 13 Drawing Sheets

Related U.S. Application Data continuation of application No. PCT/EP2012/052785, filed on Feb. 17, 2012.

(60) Provisional application No. 61/444,452, filed on Feb. 18, 2011.

(51) Int. Cl.
*A47K 4/00* (2006.01)
*B64D 11/04* (2006.01)
*B64D 11/06* (2006.01)

(52) U.S. Cl.
CPC .......... *B64D 11/04* (2013.01); *B64D 11/0691* (2014.12); *B64D 2011/0046* (2013.01)

(58) Field of Classification Search
CPC ........ B64D 2011/0046; B64D 11/0691; E03C 1/01; A47K 4/00
USPC .................. 244/118.5, 118.2, 118.1
See application file for complete search history.

(56) References Cited

U.S. PATENT DOCUMENTS

| | | |
|---|---|---|
| 6,073,883 A | 6/2000 | Ohlmann et al. |
| 6,079,669 A | 6/2000 | Hanay et al. |
| 7,931,047 B2 | 4/2011 | Gonnsen et al. |
| 8,136,763 B2 | 3/2012 | Saint-Jalmes et al. |
| 8,944,377 B2 | 2/2015 | McIntosh |
| 9,045,231 B2 | 6/2015 | Swain |
| 2002/0062521 A1 | 5/2002 | Itakura |
| 2003/0155466 A1 | 8/2003 | Wentland et al. |
| 2004/0163170 A1 | 8/2004 | Cooper et al. |
| 2004/0227034 A1 | 11/2004 | Wentland et al. |
| 2005/0125891 A1 | 6/2005 | Stratmann |
| 2005/0241062 A1 | 11/2005 | Quan |
| 2009/0065641 A1 | 3/2009 | Koehn et al. |
| 2009/0242699 A1 | 10/2009 | Wentland et al. |
| 2009/0261200 A1 | 10/2009 | Saint-Jalmes et al. |
| 2013/0001359 A1 | 1/2013 | Schliwa et al. |
| 2013/0206904 A1 | 8/2013 | Gee et al. |
| 2014/0048650 A1 | 2/2014 | Schliwa et al. |

FOREIGN PATENT DOCUMENTS

| | | |
|---|---|---|
| DE | 4300877 A1 | 7/1994 |
| DE | 4336418 A1 | 4/1995 |
| DE | 10204343 A1 | 8/2003 |
| EP | 0867365 A2 | 9/1998 |
| EP | 1209078 A2 | 5/2002 |
| EP | 1338508 A2 | 8/2003 |
| FR | 2910436 A1 | 6/2008 |
| JP | 05163758 A | 6/1993 |
| RU | 2124459 C1 | 1/1999 |
| WO | 0170116 A1 | 2/1986 |
| WO | 2004076281 A1 | 9/2004 |
| WO | 2008102070 A1 | 8/2008 |
| WO | 2008139212 A1 | 11/2008 |
| WO | 2011101385 A2 | 8/2011 |

MODULAR CABIN SEGMENT, CABIN FOR A VEHICLE AND VEHICLE WITH A CABIN

CROSS-REFERENCE TO RELATED APPLICATIONS

The present application is a continuation of U.S. patent application Ser. No. 13/968,855, filed Aug. 16, 2013, which claims the benefit of International Application No. PCT/EP2012/052785, filed Feb. 17, 2012, which claims the benefit of the filing date of German Patent Application No. 10 2011 011 704.0 filed Feb. 18, 2011 and of U.S. Provisional Patent Application No. 61/444,452 filed Feb. 18, 2011, the disclosures of which applications are hereby incorporated herein by reference.

FIELD OF THE INVENTION

The invention relates to a modular cabin segment for a vehicle, to a cabin for a vehicle comprising at least one such modular cabin segment, and to a vehicle with such a cabin.

BACKGROUND OF THE INVENTION

Vehicles for transporting passengers, which vehicles have a cabin with passenger seats arranged therein, usually need to meet economic expectations so that, in the design of passenger cabins with limited space provided, the largest-possible number of passengers can be transported. In particular if the vehicle is used to travel longer distances, apart from the passenger seats, further equipment features are required in order to ensure passenger wellbeing. Apart from toilets this also relates to equipment for heating, cooling, the preparation and storage of food and drinks.

Parallel to this, in particular in the case of commercial aircraft or other technically complex vehicles, there is also the desire of many operators to design a cabin according to their own wishes. Usually, in the case of aircraft this requirement is met by a number of galley monuments or toilet monuments standardized by the manufacturer of the aircraft. These monuments often separate individual cabin sections from each other in longitudinal direction of the cabin and are often provided so as to be separate from each other.

Furthermore, in particular in commercial aircraft it is a regulatory requirement to provide a cabin attendant seat for each cabin attendant so that each cabin attendant can take up a safe position during takeoff and landing of the aircraft, which cabin attendant seat additionally occupies already confined space in the cabin.

DE 43 00 877 A1 and U.S. Pat. No. 5,474,260 A disclose an aircraft with a number of supply devices and toilets that are designed as independent conventional toilet compartments.

BRIEF SUMMARY OF THE INVENTION

An aspect of the invention proposes an advantageous design of a cabin or of a cabin segment, which design allows the best possible use of the available installation space in the cabin while meeting all the regulations and the requirements for comfort.

An aspect of the invention consists of proposing a cabin segment that comprises a modular design. In this context the term "modular" means that various modules tailored to different requirements can be selected and composed in order to be able to provide a cabin segment that is particularly advantageous to the respective operator. The term "module" refers to a part, a component or a section of a finished cabin segment.

Due to the modularity each operator of the vehicle can compose a cabin segment without the need to resort to a cost-intensive individual solution. At the same time this is economically sensible for the manufacturer of the vehicle, because many different variants of a cabin segment can be proposed without the need to conceive protracted and cost-intensive individual solutions.

A particularly preferred variant of a modular cabin segment according to an embodiment of the invention is proposed for a region in the cabin, in which region a passage is not required. This could, for example, relate to a rear section of an aircraft or to a front section if a separate entry to the cockpit is to be provided. In other vehicles, for example in ferries, trains or the like, a modular cabin segment according to an embodiment of the invention could also be arranged in a rear part of the vehicle in question. The use of a rear section makes sense in particular in commercial aircraft, because in a commercial aircraft a pressure bulkhead is arranged to delimit the cabin, which pressure bulkhead comprises an outward-curvature that could be used by toilet arrangements.

Below, some references relate to a longitudinal axis, a transverse axis and/or a vertical axis. The term "longitudinal axis" refers to the spatial direction that correlates with a longitudinal axis of the vehicle or with a parallel to the aforesaid, wherein this longitudinal axis can also be the longitudinal axis of a cabin in which the cabin segment according to an embodiment of the invention is arranged. Consequently, the term "transverse axis" relates to an axis that is arranged so as to be perpendicular to the longitudinal axis and that is situated in the horizontal. Accordingly, the term "vertical axis" refers to the axis that extends in vertical direction and that is situated so as to be perpendicular both on the longitudinal axis and on the transverse axis.

A modular cabin segment according to an embodiment of the invention comprises a first lateral segment module that accommodates a first toilet arrangement with at least one toilet compartment. The cabin segment according to an embodiment of the invention further comprises a second lateral segment module, wherein in each case a lateral face of the first and of the second lateral segment module is designed to snugly fit in each case to an inner wall of the cabin of the vehicle so as to correspond to the aforesaid. According to an embodiment of the invention, at least one of the modules may comprise a cabin attendant seat which on one side can be pivoted on a vertical axis on the at least one module.

The cabin segment according to an embodiment of the invention thus extends in a transverse axis preferably from a sidewall of a cabin that is to be equipped with the cabin segment according to an embodiment of the invention up to the opposite sidewall, wherein this space comprises at least one first lateral segment module and a second lateral segment module. Such a cabin segment can be designed in a particularly advantageous manner by the integration of various functions so that the space taken up by the cabin segment according to an embodiment of the invention is utilized as optimally as possible.

A special feature on one hand consists of the possibility of positioning, apart from a first toilet arrangement, also completely different arrangements in the cabin segment according to an embodiment of the invention. The function of the first lateral segment module is not limited to the use of a toilet arrangement. Instead, the particular operator of the vehicle that comprises a cabin with at least one cabin segment according to an embodiment of the invention can compose a cabin segment from various modules. However, all the cabin segments share a common feature in that a cabin attendant seat is pivotally arranged on one of the modules, wherein a special feature consists of pivoting on an axis, and preferably on a vertical axis, wherein the bearing arrangement that can be pivoted is implemented laterally. In known cabin attendant seats that can be pivoted it is often necessary to pivot or rotate a kind of platform or base plate which, due to the geometric extension needed for this, severely restricts the possibilities of the surrounding installation space.

The bearing arrangement that can be laterally pivoted makes it possible to pivot a cabin attendant seat, for example from an in-use position to a stowed position so that the design space usually taken up by the cabin attendant seat is useable for other purposes almost without restriction.

In an advantageous embodiment of the invention, the cabin attendant seat is held on the at least one module in such a manner that it can be pivoted either in front of a toilet arrangement or in front of at least one storage compartment. Pivoting it in front of at least one storage compartment simplifies, in particular, pivoting the cabin attendant seat to a stowed position and to an in-use position, as well as locking it in those positions. In the case of pivoting in front of access openings of toilet arrangements the locking mechanism would have to be implemented either directly on the bearing arrangement that can be pivoted or in the floor region, or wall thicknesses of a housing of the toilet arrangement would have to be reinforced in order to accommodate locking means. If the cabin attendant seat is, for example, held on a galley module with storage compartments, because of the use for accommodating cabin trolleys and for storing food, compartments are provided in that location, which compartments can withstand greater mechanical loads than is the case with pure space dividing walls, which compartments can relatively easily accommodate the hinge of the cabin attendant seat and its load. In order to allow for future modification of a cabin segment according to an embodiment of the invention to allow an attendant seat to be retrofitted a relevant walling of the housing of the toilet arrangement or another walling of one of the lateral segment modules would have to be reinforced.

In an advantageous embodiment of the invention the cabin segment furthermore comprises at least one central module that is arranged between the first lateral segment module and the second lateral segment module.

In a particularly advantageous embodiment the second lateral segment module is a galley module. In the simplest case a galley module can comprise storage compartments for accommodating food, cutlery, napkins, auxiliary utensils and the like. In particular when used in an aircraft such storage compartments comprise flaps with a locking mechanism so that the objects are secured against falling out. Likewise, a galley module can comprise one or several parking spaces for cabin trolleys used to store food, transport them to the passengers in the cabin, and subsequently take up waste and the like. If required, the parking space can also comprise a cooling device, or can be connected to a central cooling device, located further away within the vehicle, in order to cool food and drinks in the corresponding cabin trolley.

In the modular cabin segment according to an embodiment of the invention a parking space can be arranged whose dimensions make it possible to accommodate a wheelchair in its folded state. Particularly preferably, for this purpose a parking space for a cabin trolley is modified in such a manner that it provides the necessary width and height to accommodate the wheelchair and thus can be reconfigured from a parking space for a cabin trolley to a parking space for a folded wheelchair, when desired. Normally, these dimensions exceed the space required for the cabin trolley. If required, or if there is a corresponding operating regulation to carry the wheelchair of a person with limited mobility in the passenger cabin during the flight or during the journey, the cabin segment according to an embodiment of the invention thus allows non-blocking and practical accommodation of the wheelchair.

In an advantageous embodiment any desired module of the cabin segment according to an embodiment of the invention could comprise a parking space for a cabin trolley which in a delimitation surface comprises a rail or some other guide means that make it possible to readily insert the cabin trolley and lock it into place, and at the same time however also makes it possible to accommodate a wheelchair in its folded state in the parking space. Furthermore, the parking space for the cabin trolley in this case could comprise a cover flap, or at least a partial flap, that prevents the wheelchair from sliding out.

In an advantageous embodiment of the invention the at least one central module or the first lateral segment module comprises a second toilet arrangement with at least one toilet compartment. If the requirement in the particular vehicle tends to be for minimizing the design space occupied by galleys or storage compartments, it would be possible in this manner to be able to provide increased capacity for toilets in order to elsewhere in the cabin be able to do away with an independent toilet monument, and in this way accommodate additional passenger seats in this region that is becoming available. In this manner the economic efficiency of the vehicle can be further improved without having to do without necessary installations.

In a particularly advantageous variant the second toilet arrangement is arranged at a position facing the first toilet arrangement of the first lateral segment module. Not only does this make it possible to implement shared suction-removal of odors from these adjacent toilet arrangements, but it can also simplify the routing of suction lines and flushing lines, because the corresponding consumers in the form of the toilet arrangements are adjacent.

In an advantageous embodiment of the invention the second toilet arrangement extends over the entire width of the at least one central module. This means that the region between the first lateral segment module and the second lateral segment module could be taken up completely by a toilet arrangement comprising at least one toilet, a urinal or the like, if a single central module is provided. In this manner a number of toilets can be provided in a cabin segment according to the invention, provided the design space within the cabin is sufficient for this, and consequently it is possible to do without a toilet monument in some other region of a passenger cabin, and instead of said toilet monument further passenger seats could be provided.

In an advantageous embodiment of the invention, the at least one central module comprises a parking space for at least one "half-size" cabin trolley as well as at least one storage compartment, wherein the cabin attendant seat is held on the at least one central module in such a manner that it can be pivoted in front of an access opening of the second toilet arrangement or in front of the storage compartment. Since the cabin attendant seat is a component that anyway is used relatively rarely and at other times merely "wastes" design space, it is very advantageous to pivot the cabin attendant seat in front of an access opening of the second toilet arrangement only in those phases where the use of the toilets is not desired anyway. In the case of aircraft, these phases are, in particular, the takeoff and landing phases. During the operation phases of the vehicle, in which phases the cabin attendant seat is not required, said cabin attendant seat can be pivoted on the central module, for example parallel to a direction of access to the second toilet arrangement, and consequently unhindered entry to the second toilet arrangement is possible, and the design space around this access opening is not blocked.

Furthermore, it is not mandatory for the individual modules of the cabin segment according to an embodiment of the invention to be divided evenly in transverse direction; they can also, grouped according to the purpose of use, comprise projections, steps and indentations in transverse direction, which nonetheless make possible a composition to form an entire cabin segment. This means that, for example, at least part of an above-mentioned central module, which supports various functions, and a lateral segment module can be interconnected in the form of an enlarged lateral segment module. In this manner, for example, toilet compartments of a central module could be combined with toilet compartments of a lateral segment module. Furthermore, galley functions or storage compartments and parking spaces of a central module could be combined with similarly equipped lateral segment modules. In this manner one or two enlarged lateral segment modules could arise that can be combined to form one cabin segment. Separation of functions can simplify manufacture of the individual lateral segment modules.

In an advantageous embodiment the second toilet arrangement comprises a toilet compartment with a urinal, wherein the toilet compartment and the at least one storage compartment of the central module are arranged side by side in transverse direction. Such stringing together of functions within a single cabin segment module makes possible very space-saving integration of various functions, because the urinal requires only very little space when compared to a conventional toilet, so that the unoccupied design space could be taken up by a storage compartment arrangement.

In an advantageous embodiment of the invention, a partition wall is arranged between a first toilet compartment and an adjacent second toilet compartment, irrespective of the association with a lateral or central segment module. The partition wall may be fixedly arranged. It is preferred that the partition wall allows its later removal in order to replace the fixed partition wall with a movable partition wall. Thereby a modularity regarding the convertibility of two separated toilet compartments to a larger, single toilet compartment is created.

In an advantageous embodiment the partition wall is movably held and is designed to be brought to an opening position in which separation between the first toilet compartment and the second toilet compartment is canceled. In this manner it is possible without further ado to create a toilet for the disabled, into which toilet a person in a wheelchair can drive and have enough space for accommodating the wheelchair.

In an advantageous embodiment of the invention, the partition wall is constructed from individual partition wall segments that are movably held. In this manner by means of easy pivoting or folding-over of partition wall segments an individual, larger toilet compartment can be created.

In an advantageous embodiment of the invention, a first partition wall segment is designed to be hinged to a first sidewall of the first toilet compartment, while the second partition wall segment is designed to be pivoted into a region that is not situated in the first toilet compartment or in the second toilet compartment. After moving into a thus formed joint, larger, toilet compartment, the second partition wall segment can be pivoted back to the joint toilet compartment, for example in order to be used as a door or a cover flap.

In an advantageous embodiment of the invention, a direction of extension of the first toilet compartment and a direction of extension of the second toilet compartment are arranged so as to be essentially perpendicular to each other. This means that the first toilet compartment and the second toilet compartment together form an L-shape that is advantageous in particular for dividing the partition wall into two partition wall segments.

An embodiment of the invention includes a cabin for a vehicle, which cabin comprises at least one cabin segment according to the invention, as explained above.

Furthermore, another embodiment includes a vehicle that comprises a cabin with at least one cabin segment described herein. In particular, this vehicle can be an aircraft, thus providing significant advantages when compared to known aircraft from the state of the art.

DETAILED DESCRIPTION

Figure 1A:
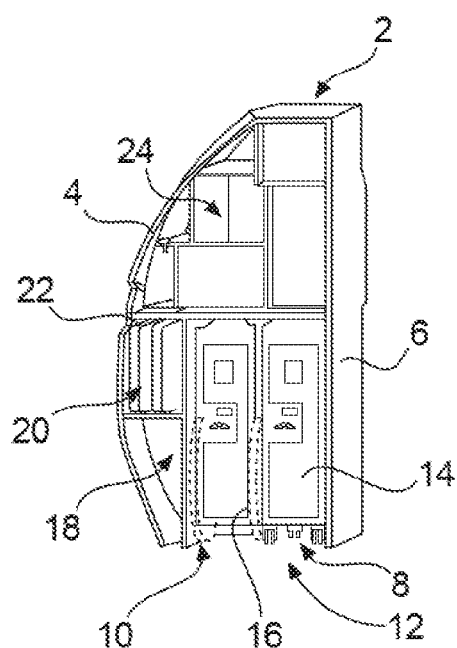
FIGS. 1a to 1f show diagrammatic views of segment modules of a cabin segment according to the invention in the form of a modular system.

FIG. 1a shows a lateral segment module 2 which in the preceding description was referred to as the second lateral segment module. It comprises an outer lateral face 4 and an inner lateral face 6 that delimit the second lateral segment module 2 in transverse direction or in horizontal direction. In this arrangement the outer lateral face 4 is shaped in such a manner that it can snugly fit to an inner wall of a cabin, and thus is designed so as to correspond to the aforesaid. In the example shown, the outer lateral face 4 is round, thus corresponding to one or several graduated circles of the fuselage of the corresponding vehicle. The inner lateral face 6 is planar and extends in vertical direction so that other modules can join while adapting to the inner lateral face 6.

The second lateral segment module comprises a first parking space 8 and a second parking space 10 that are arranged in a lower half of the second segment module and that follow on from a base 12 that is positionable on a cabin floor. A parking space 8 arranged on the inner lateral face 6 is suitable for accommodating a cabin trolley 14, wherein preferably also locking means (not shown in detail) can be arranged that prevent inadvertent releasing of the cabin trolley 14 from its parking space 8. Preferably, the parking space 8 also comprises means for cooling or means for guiding a cold substance from a central device for proving a cooled coolant to the cabin trolley 14 so that food contained therein can be cooled during operation of the vehicle.

The parking space 10 facing the outer lateral face 4 is also equipped to accommodate a cabin trolley 14, and preferably also to lock it. A further design characteristic of this outer parking space 10 could consist of providing adequate width to accommodate a wheelchair 16 in order to meet any operating regulations of providing in a vehicle, and in particular in an aircraft, the possibility of accommodating a wheelchair.

Since the second lateral segment module 2 adapts to an outer wall of a vehicle fuselage, and consequently the outer lateral face 4 is heavily curved, in the space between the outer parking space 10 and the outer lateral face 4 there is only relatively little design space, which in the present example is used by two storage compartments 18 and 20. The upper of these two storage compartments 20 can, for example, accommodate various objects such as trays or elongated packages comprising food or auxiliary resources required on board the vehicle, for example a wheelchair ("onboard wheelchair").

By means of a horizontal intermediate floor 22 that extends in transverse direction, which horizontal intermediate floor 22 can be designed as a work surface, further storage compartments 24 of various sizes are partitioned off from the parking spaces 8 and 10 and can, in particular, be used for accommodating food that does not need to be cooled.

As an alternative to this, the compartments 24 arranged above the horizontal intermediate floor 22 or the work surface can be designed to accommodate various items of technical equipment which are, for example, used to heat food and drinks.

Figures 1B, 1C:
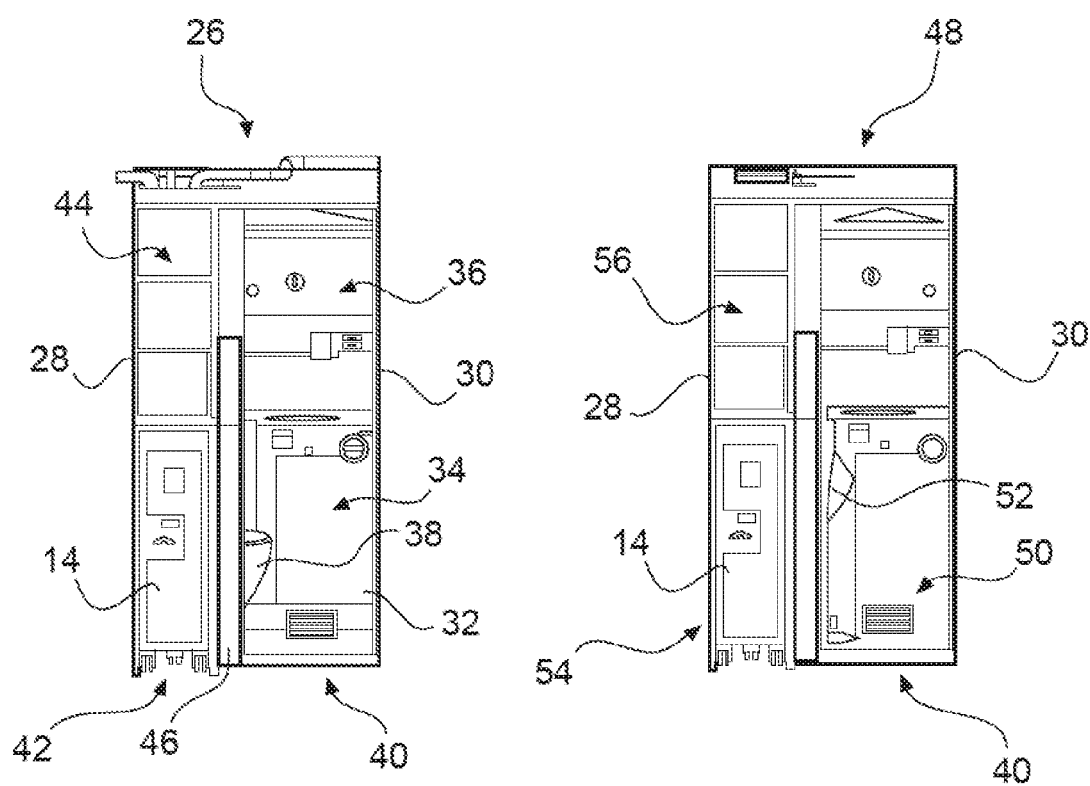

In FIG. 1b as an example a first central module 26 is presented that comprises a first lateral face 28 and a second lateral face 30, which faces delimit the central module 26 in transverse direction. As an example, this central module 26 is designed, in particular, as a toilet module so that an access opening 32 to a toilet compartment 34 is arranged which can be closed by means of a door 36. The toilet compartment 34 itself is of an L-shaped design, wherein a toilet 38 extends in transverse direction so that it is possible to use the remaining design space starting from a rectangular base 40 through a parking space 42 and compartments 44 arranged above.

To avoid excessively limiting the comfort within the toilet compartment 34, the extension, in longitudinal direction, of the parking space 42 and of the compartments 44 is relatively short so that for example in an application in an aircraft only those cabin trolleys 14 can be inserted that comprise half the normal depth. Such cabin trolleys are referred to as half-size trolleys.

This illustration of the central module 26 shows that a cabin attendant seat 46 is provided that is pivotally held on the central module 26. This cabin attendant seat 46 is discussed in detail later.

FIG. 1c shows a further exemplary central module 48 based on the same base 40, except instead of an L-shaped toilet compartment 34 it comprises an essentially rectangular toilet compartment 50 extending in longitudinal direction, which toilet compartment 50, however, comprises a urinal 52 instead of a toilet 38. Said urinal 52 can be used with the person standing upright, and consequently significantly less space is required.

The design space that can be saved in comparison to the central module 26 of FIG. 1b can be utilized by additional depth of the parking space 54 or of the compartments 56 arranged above it. This makes it possible to park more than only one "half-size" cabin trolley 14; for example a normal cabin trolley and a "half-size" cabin trolley could be arranged one behind the other in longitudinal direction, or alternatively three "half-size" cabin trolleys 14. The same applies to the storage compartments 56, which comprise three times the stowage volume of the central module 26 from FIG. 1b.

In particular when designing the cabin of a vehicle, the available toilet arrangements must be assessed because not every passenger requires a complete toilet compartment 34; instead, by providing a urinal 52 with a significantly reduced toilet compartment 50, adequate sanitary installations could be created that would result in significant savings of installation space.

Figure 1D:
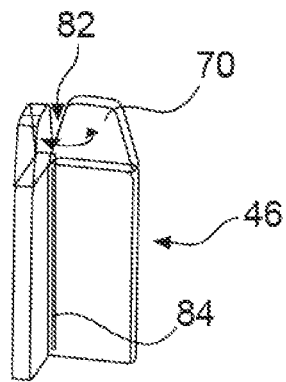
Figure 1E:
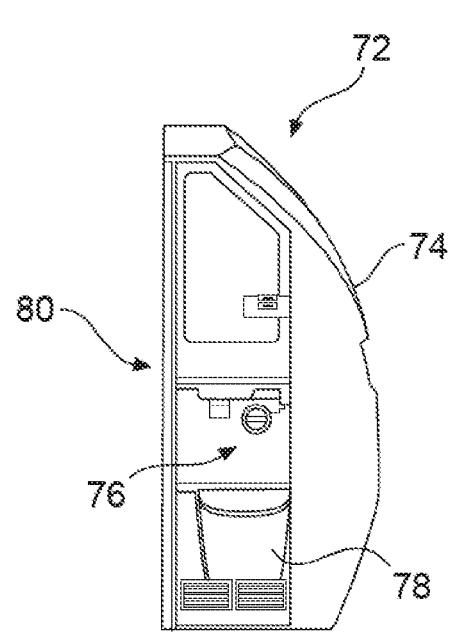
Figure 1F:
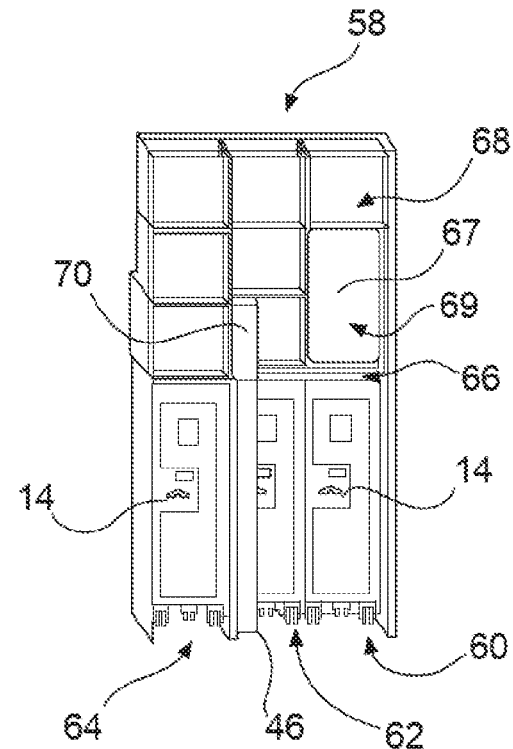

If it is not necessary to equip the cabin segment according to an embodiment of the invention with an excessive number of toilet arrangements, a central module 58, as shown in FIG. 1f, could be used.

The central module 58 comprises a total of three parking spaces 60, 62 and 64 in which cabin trolleys 14 can be parked. In this arrangement a parking space 64 extends further outwards in longitudinal direction than is the case with the two other parking spaces 60 and 62, and consequently a cabin attendant seat 46 can be pivotally arranged on the resulting projecting wall. This design furthermore makes it possible to park two conventional cabin trolleys 14 in the parking spaces 60 and 62, as well as a conventional cabin trolley 14 and a "half-size" cabin trolley 14 in the parking space 64, or alternatively three half-size cabin trolleys if desired.

An intermediate floor 66 extends horizontally on the parking spaces 60, 62 and 64, where storage compartments 68 are arranged.

In the illustrated exemplary embodiment of the central module 58 the cabin attendant seat comprises a removable headrest part 70 that in a stowed position of the cabin attendant seat 46 can be removed or folded away in order to allow unrestricted access to the storage compartments 68. When the cabin attendant seat 46 is required, it can be pivoted in front of the parking spaces 60 and 62 and can be equipped again with the removable headrest part 70. While as a consequence of this the parking spaces 60 and 62 or the parking space 64 are blocked, this would, however, occur only at those times when no cabin trolley 14 is moved about, for example during takeoff and landing.

Furthermore, in the central module 58 shown, for the purpose of heating food an oven 67 is arranged which can be operated by way of a pivotally held flap that is useable as a work surface. When the cabin attendant seat 46 is pivoted into the free aisle in front of the module, it may be possible to do without taking off the headrest.

FIG. 1e shows a first lateral segment module 72 that comprises an outer lateral face 74 that is designed so as to correspond to the inner wall of the cabin in the provided installation location. In this variant the lateral segment module 72 comprises a toilet compartment 76 in which a toilet 78 is arranged that extends in longitudinal direction. In this manner with sufficient depth of the segment module 72 a conventional toilet function can be ensured. The inner lateral face 80 is of a planar design and extends vertically so that central modules 26, 48 or 58 can follow on from it.

Finally, FIG. 1d shows a cabin attendant seat 46 with a headrest part 70 that could be designed so as to be removable if this appears to be necessary in a provided stowage position.

On one side 82 the cabin attendant seat 46 comprises a hinge 84 that need not necessarily extend over the entire height of the cabin attendant seat 46. Said hinge 84 could also be positioned only in some locations over the height of the cabin attendant seat 46 in a manner similar to door fittings.

Furthermore, it should be added that the cabin attendant seat 46 is only shown diagrammatically; usually it comprises a fold-down seat surface and suitable seat belt and fastening means so that a cabin attendant can safely sit on said cabin attendant seat 46 and fasten the seat belt. Moreover, it should be mentioned that the pivotally held cabin attendant seat 46 must, of course, also comprise suitable locking means by means of which it can be held safely both in its stowed position and in its in-use position.

Figure 2:
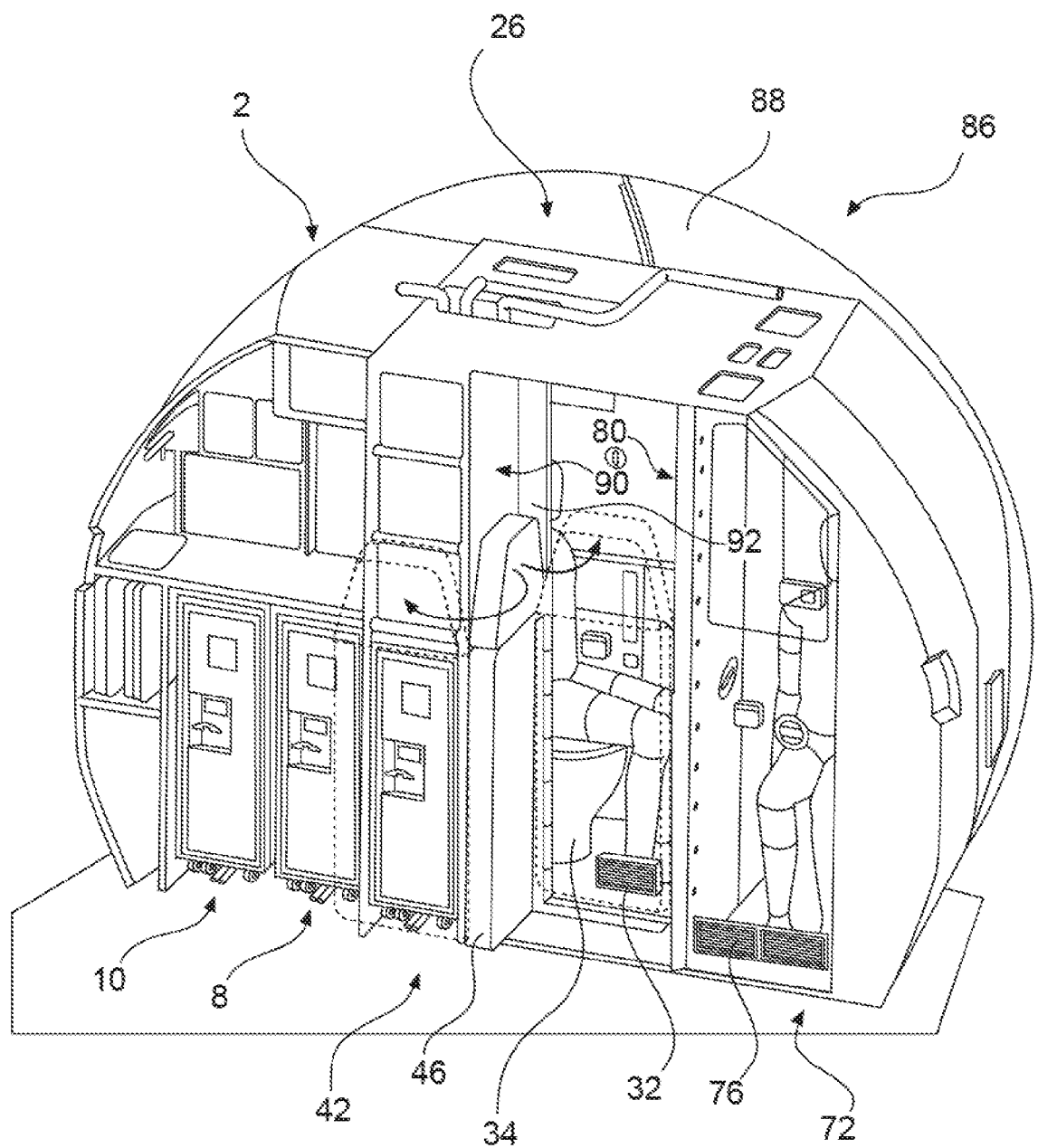
FIG. 2 shows a three-dimensional view of a first exemplary embodiment of the cabin segment according to the invention.

FIG. 2 shows a first exemplary embodiment of a modular cabin segment 86 according to an embodiment of the invention that is shown as an example of the installation in a cabin of an aircraft. In this example the cabin segment 86 according to an embodiment of the invention is located in a rear section of the aircraft cabin, in which a pressure bulkhead 88 is also arranged that normally at least in some sections corresponds to a spherical segment. This design space can normally not be fully used, but by arranging the cabin segment 86 according to an embodiment of the invention in this region, for example in a toilet arrangement, it is possible to provide more space for users than is the case in conventional toilet monuments.

The exemplary embodiment shown is a combination of a second lateral cabin segment 2, a central module 26 and a first lateral segment module 72. Accordingly, in the variant shown, the cabin segment 86 according to an embodiment of the invention comprises parking spaces for a total of 2½ cabin trolleys, a row of storage compartments 24 and 44, as well as two complete toilet compartments 34 and 76.

As shown in the three-dimensional view of the cabin segment 86 according to an embodiment of the invention, the parking space 42 of the central module 26 extends further into a cabin of the aircraft than does the toilet compartment 34 so that the resulting projecting wall 90, which extends parallel to the longitudinal direction, is suitable for accommodating a cabin attendant seat 46. In this arrangement the access opening 32 is somewhat narrower than the distance between the wall 90 and the inner lateral face 80 of the first lateral segment module so that the hinge of the cabin attendant seat 46 can be arranged on the resulting projection 92, and at the same time the access opening 32 is not blocked. To use the cabin attendant seat 46 it can be pivoted to the entrance opening 32 so that the entrance opening 32 is blocked, which due to the infrequent times when the cabin attendant seat 46 is being used, and the concurrent undesirable use of the toilet, is unproblematic. As an alternative, pivoting in front of the adjacent parking space for a cabin trolley 14 would be imaginable and sensible, because the wall that delimits this parking space 42 is mechanically very strong. Furthermore, because of the mechanical strength the adjacent wall can particularly easily receive a locking means for locking the cabin attendant seat 46. In this variant 3½ cabin trolleys 14 can be accommodated.

Figure 3:
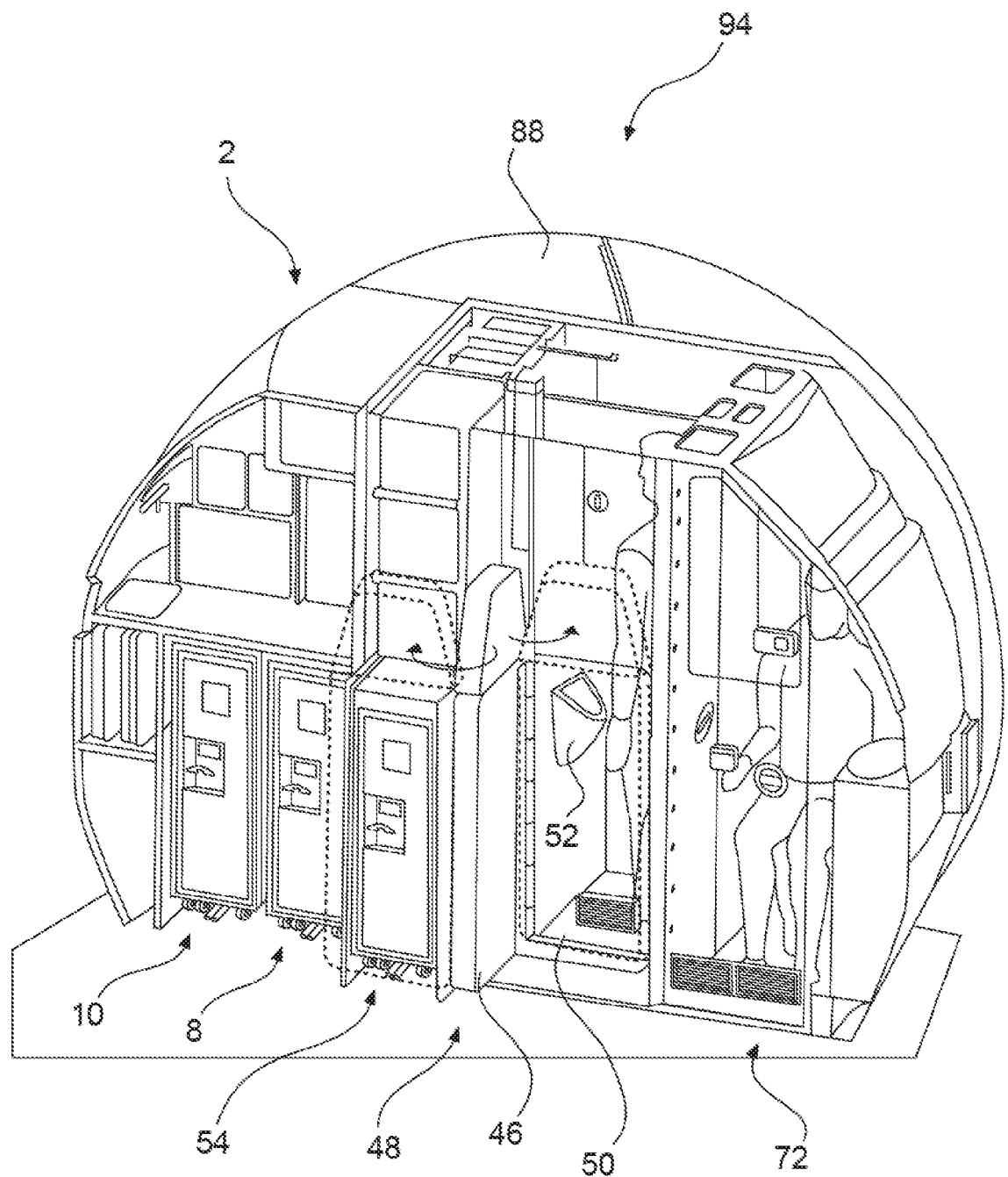
FIG. 3 shows a three-dimensional view of a further exemplary embodiment of the cabin segment according to the invention.

FIG. 3 shows a further modification of a cabin segment 94 according to an embodiment of the invention, in which apart from the second lateral segment module 2 a central module 48 with a urinal 52, and a first lateral segment module that follows on from the aforesaid are used. In this arrangement, too, the cabin attendant seat 46 is arranged on a projection 92 and can be pivoted to an in-use position that blocks an access opening to the toilet compartment 50 or to the parking space 54.

Figure 4:
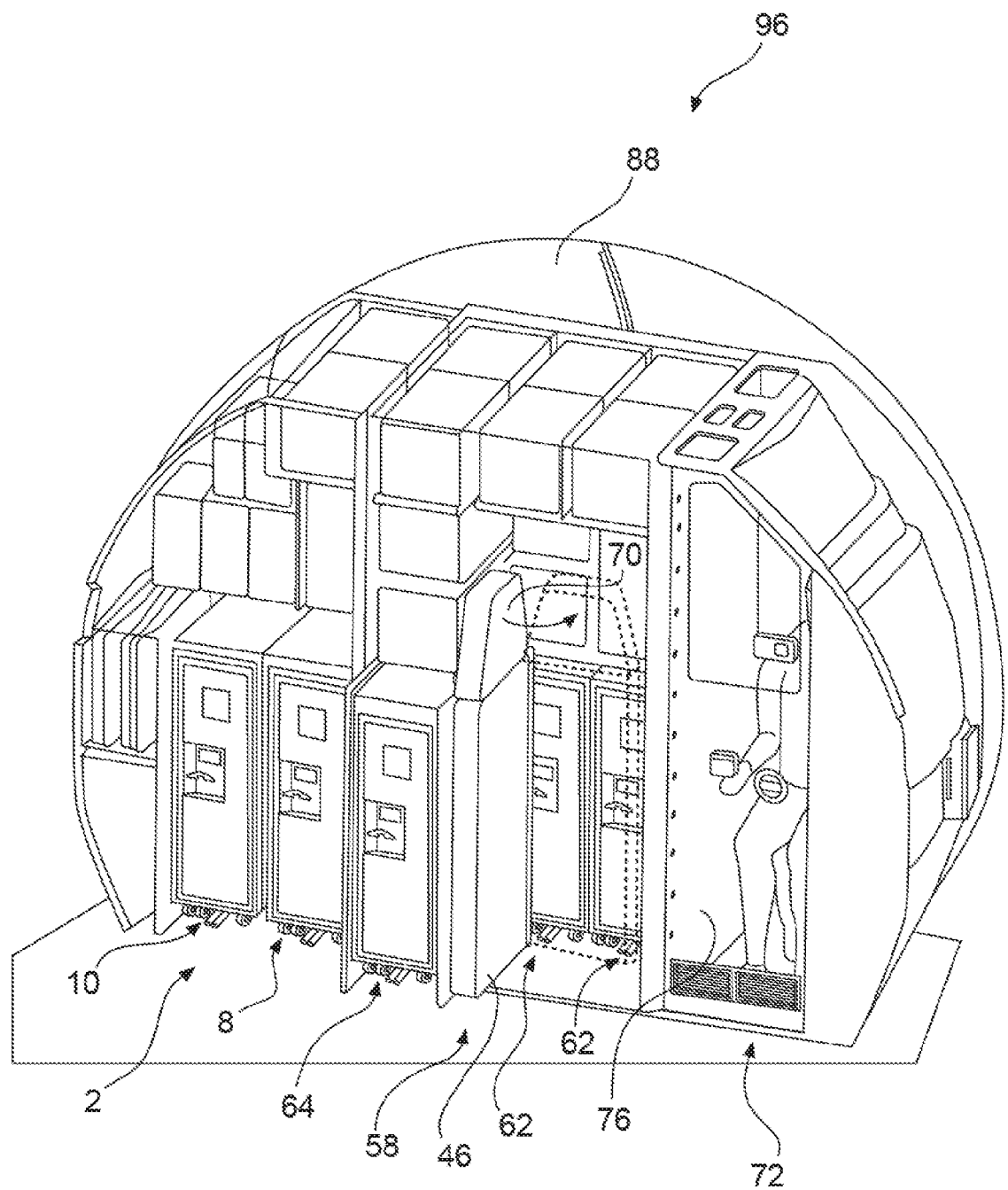
FIG. 4 shows a three-dimensional view of a further exemplary embodiment of the cabin segment according to the invention.

FIG. 4, as an example, shows a further modification of a cabin segment 96 according to an embodiment of the invention in which a second lateral segment module 2, a central module 58 with parking spaces 60 to 64 and storage compartments 68, as well as a first lateral segment module 72, are used. While this variant only provides a single toilet compartment 76, however, parking spaces for a total of 5½ cabin trolleys 14 are provided, as are a large number of storage compartments for storing food or the like.

This illustration shows particularly clearly that one of the parking spaces 64 of the central module 58 extends significantly further into the cabin in longitudinal direction than do the other parking spaces 60 and 62 or 64, and as a consequence it is very easy to provide adequate design space for the cabin attendant seat 46.

Because of the arrangement of a multitude of storage compartments above the parking spaces for cabin trolleys 14, it is desirable if the headrest part 70 of the cabin attendant seat 46 is designed so as to be removable.

In an in-use position the cabin attendant seat 46 can be pivoted to the parking spaces 60 and 62 or 64 so that the cabin trolley 14 situated therein can no longer be wheeled out. This is also unproblematic because during those times in which the cabin attendant seat 46 is in use, there is no service to passengers anyway, and the cabin trolleys are in place in their respective parking spaces 60 and 62.

In the variant shown, the cabin attendant seat 46 is not arranged on a projection 92; instead it blocks at least in part the parking space 62 of the end of the central module 58, which end faces away from the lateral segment module 72, so that the cabin trolley 14 can be removed from this parking space 62 only when the cabin trolley of the end facing the lateral module segment 72 has been wheeled out. This will be unproblematic when providing service to passengers on board the aircraft; in return, with this variant of the cabin segment 96 according to an embodiment of the invention very strong integration of many functions, and in particular stowage space, are created.

Figure 5:
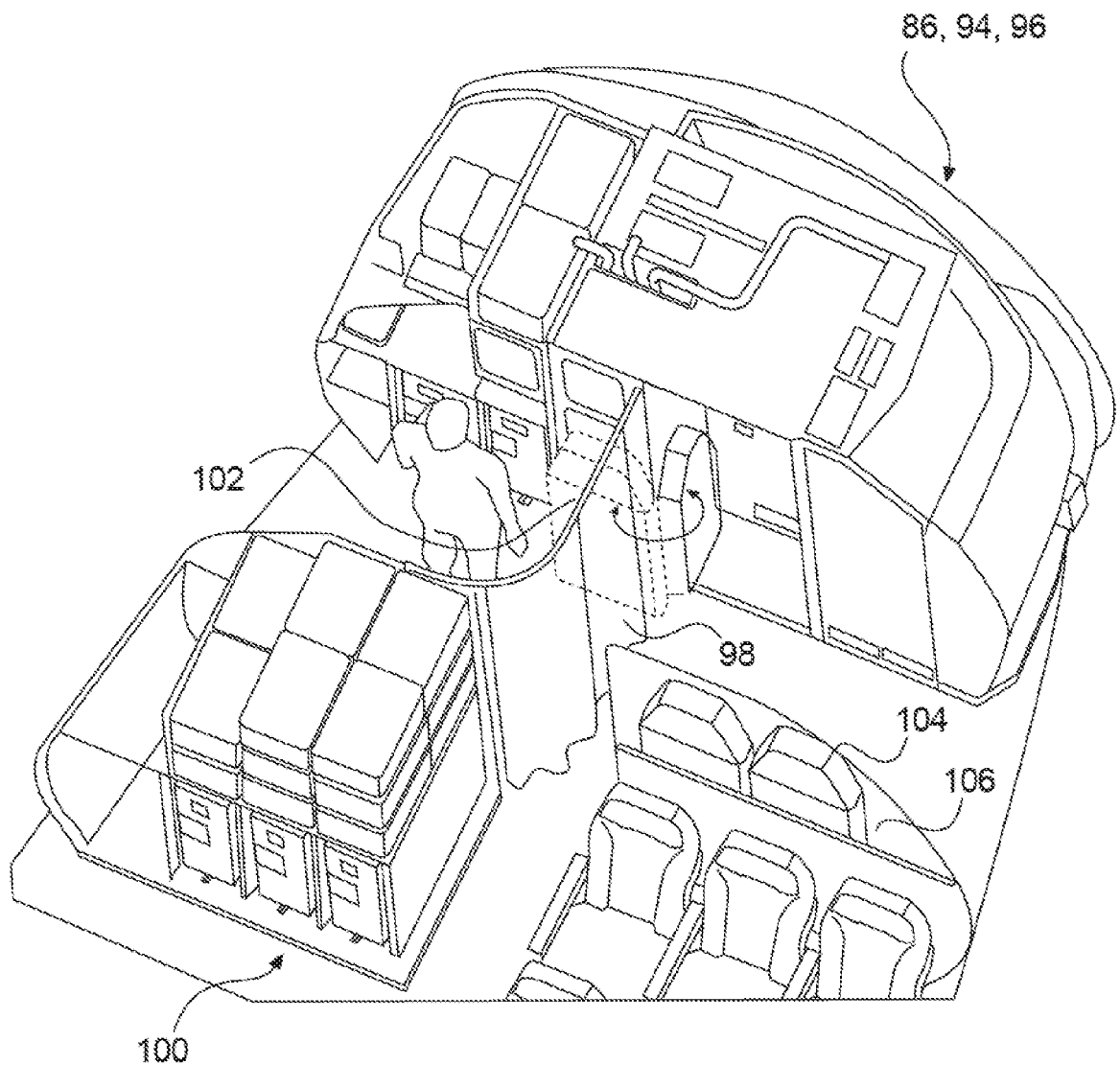
FIG. 5 shows an arrangement comprising a cabin segment according to the invention in a cabin of a vehicle.

With reference to FIG. 5, it is at least diagrammatically described that part of the cabin segment 86, 94 and 96 according to an embodiment of the invention can be separated by a dividing curtain 98 from the rest of the cabin, wherein this dividing curtain 98 is particularly preferably arranged in the center and extends towards a cabin monument 100 spaced apart in longitudinal direction and can be guided by way of a curtain rod 102 or the like.

If in this cabin region further cabin attendant seats are necessary, they can be arranged in longitudinal direction on a partition wall or a monument opposite the cabin segment 86, 94 or 96 according to an embodiment of the invention as diagrammatically shown in FIG. 5 with the example of two cabin attendant seats 104 on a partition wall 106.

Figure 6:
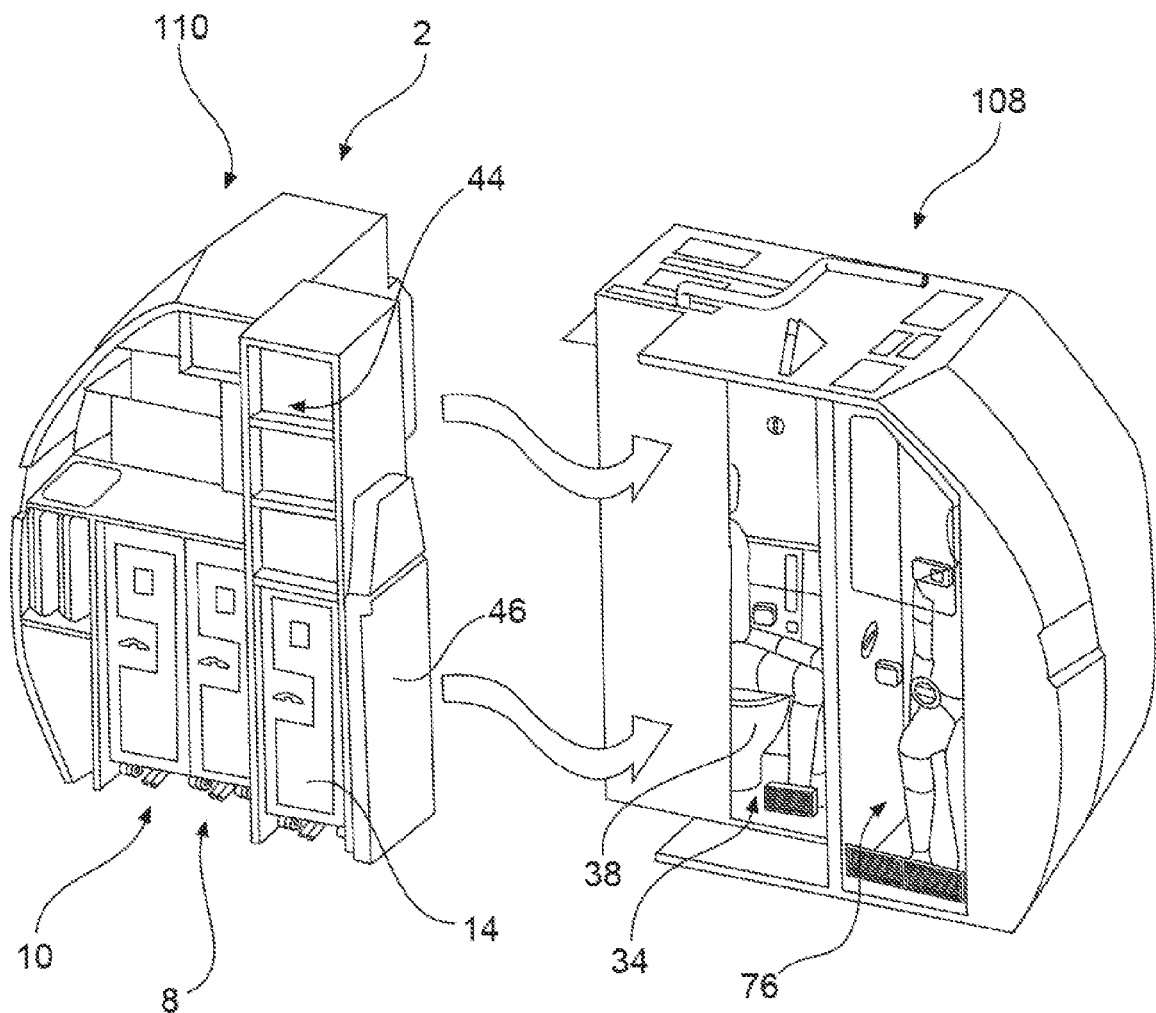
FIG. 6 shows the exemplary embodiment of FIG. 2 with an alternative module segmentation.

FIG. 6 shows the variant of a cabin segment 86 from FIG. 2 with an alternative design of the segment modules required for this. Instead of coupling a second lateral segment module 2 to a central module 26 and a first lateral segment module 72, at least from the point of view of production technology it may make sense to create a first lateral segment module 108 that exclusively comprises two toilet compartments 76 and 34 as shown in FIGS. 1b and 1e. It is understood that instead of the toilet compartment 34 it is also possible to use a modification in the form of a toilet compartment 50 that comprises a urinal 52.

In the exemplary embodiment shown, a second lateral segment module 110 could comprise the second lateral segment module 2 shown in FIG. 1a and a front part of the central module 26 that is arranged beside the toilet compartment 34 and that provides a parking space for a cabin trolley and storage compartments 44. To it the cabin attendant seat 46 that can be pivoted is also affixed.

Figure 7:
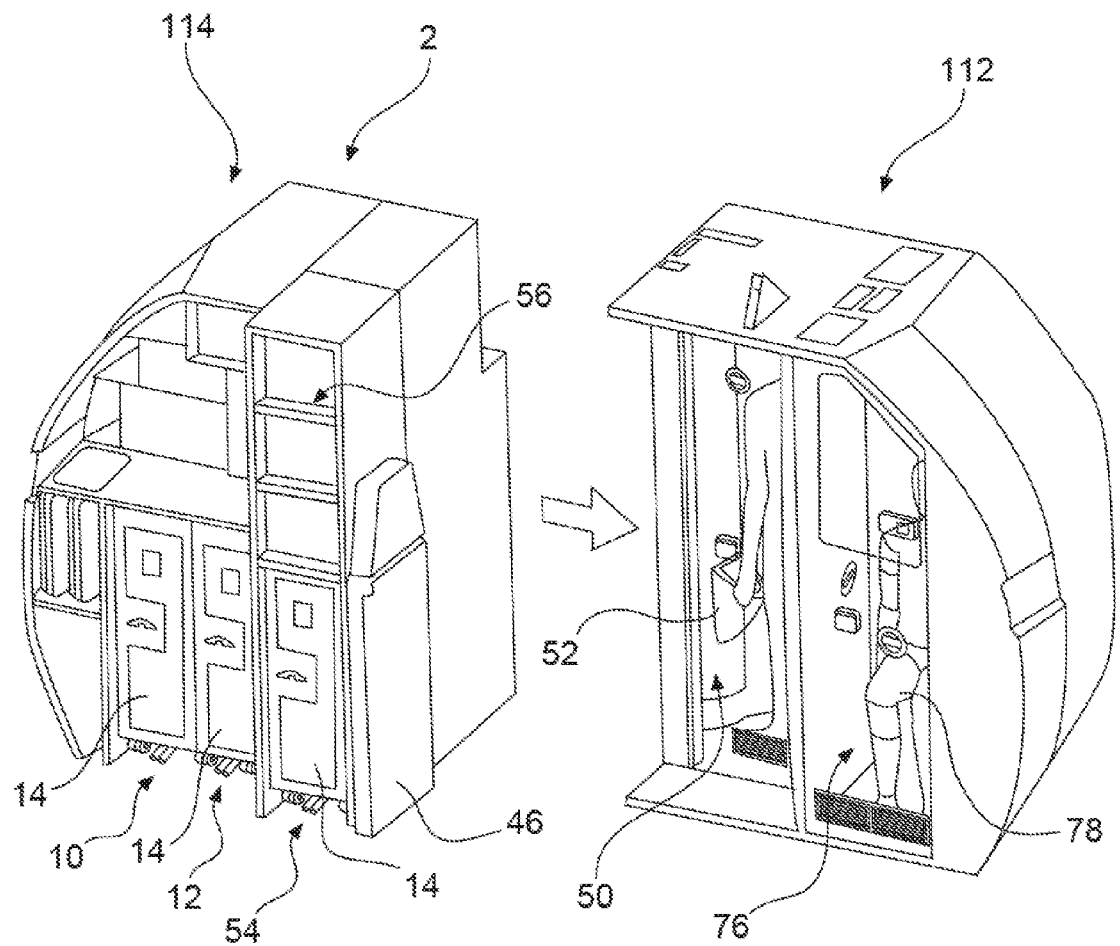
FIG. 7 shows the exemplary embodiment of FIG. 3 with an alternative module segmentation.

The variation of the arrangement of FIG. 6 for use with a urinal is shown in FIG. 7. There a first lateral segment module 112 is shown which for the purpose of simplifying production steps comprises both a toilet compartment 76 with a toilet 78 and a toilet compartment 50 with a urinal 52.

Likewise a second lateral segment module 114 is shown which practically is a combination of the second lateral segment module 2 and the arrangement comprising a parking space 54 for a cabin trolley 14 and storage compartments 56 of FIG. 1c adjacent to the toilet compartment 50.

In this arrangement the cabin attendant seat 46 is arranged on the second lateral segment module 114 where it can be pivoted.

Figure 8:
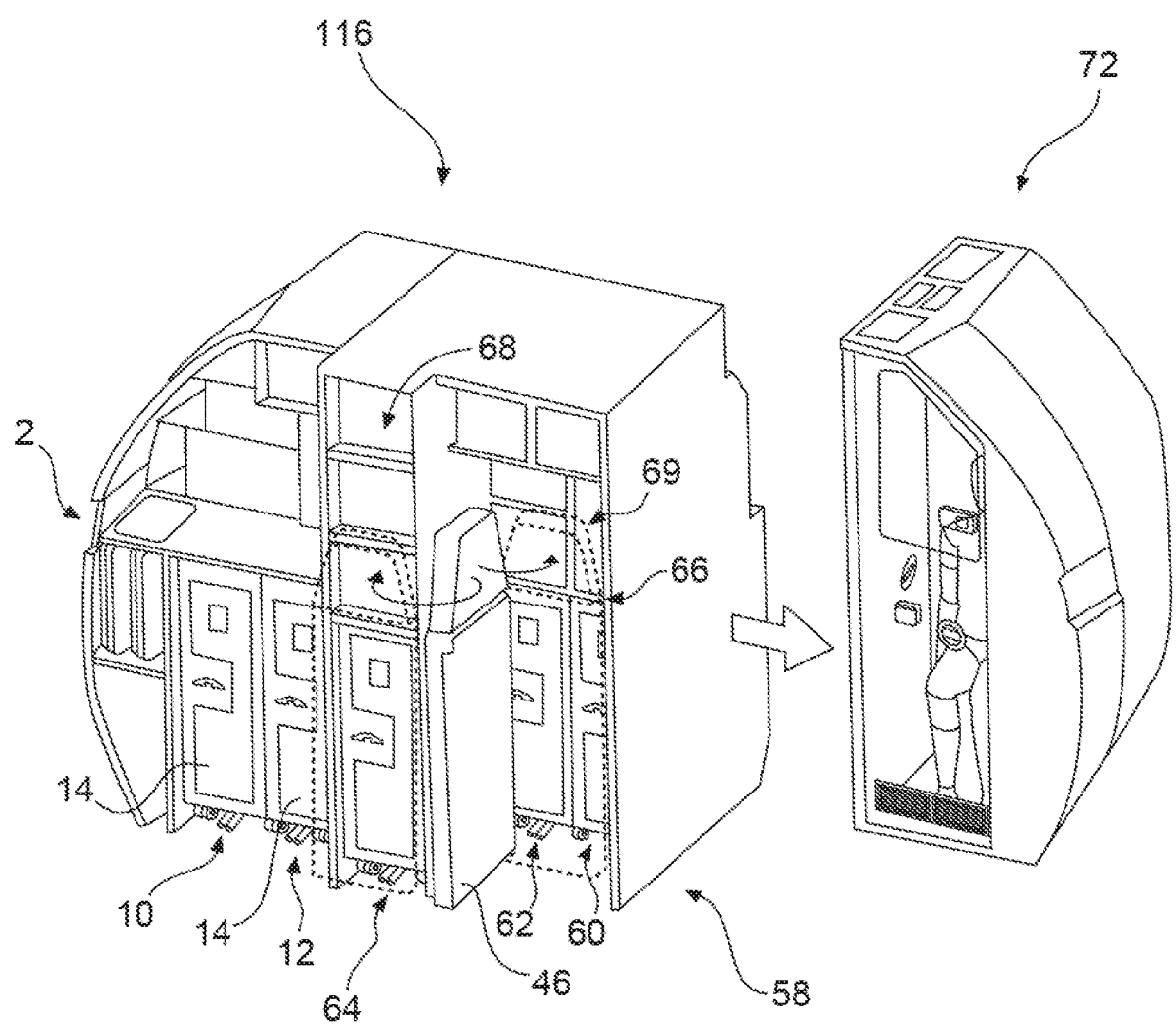
FIG. 8 shows the exemplary embodiment of FIG. 4 with an alternative module segmentation.

FIG. 8 shows a further variant, in which a first lateral segment module 72 with a second lateral segment module 116 in the form of a second lateral segment module 2 of FIG. 1a combined with a central module 58 of FIG. 1d can be combined.

In the further course the optional convertibility of adjacent toilet compartments 118 and 120 is described in detail with reference to FIGS. 9a to 9f. Said figures show a cabin segment from the preceding FIG. 2, 3, 5, 6 or 7, for the sake of simplicity, however, without any persons therein, as well as from a somewhat altered angle of view, and without a detailed illustration of the further integrated functions. The two toilet compartments 118 and 120 of the cabin segment according to an embodiment of the invention, be it toilet compartments with a toilet or with a urinal, may always be separated by means of a fixed partition wall if the operator of the aircraft does not wish a convertibility. In the shown embodiment the two toilet compartments 118 and 112 may be converted in a few simple steps and preferably without the use of tools, without the addition or removal of components, and without limitations during the flight, preferably by a flight attendant, to form an enlarged toilet compartment. Following the use of this enlarged toilet compartment the toilet arrangement according to an embodiment of the invention can then be converted back to form two separate toilet compartments.

Figure 9A:
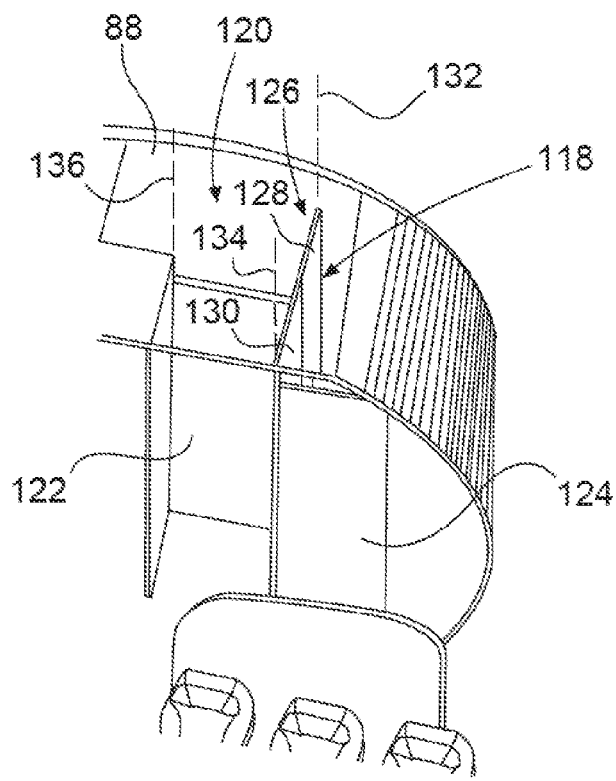
FIGS. 9a-f show a convertible toilet arrangement in the cabin segment according to the invention.

At first in FIG. 9a the first toilet compartment 120 is closed by a first toilet compartment door 122. The second toilet compartment 118 is also closed by a second toilet compartment door 124. Between the toilet compartments 120 and 118 there is a partition wall 126 comprising a first partition wall segment 128 and a second partition wall segment 130. In the example shown the first partition wall segment 128 is held on a hinge axis 132, and the second partition wall segment 130 is held on a hinge axis 134. In the example shown the two hinge axes 132 and 134 are positioned so as to be spaced apart from each other; consequently the partition wall 126 is designed as a double-wing door or a double door, and the region situated between the two hinge axes 132 and 134 forms the delimitation in longitudinal direction of the second toilet compartment 118.

Figure 9B:
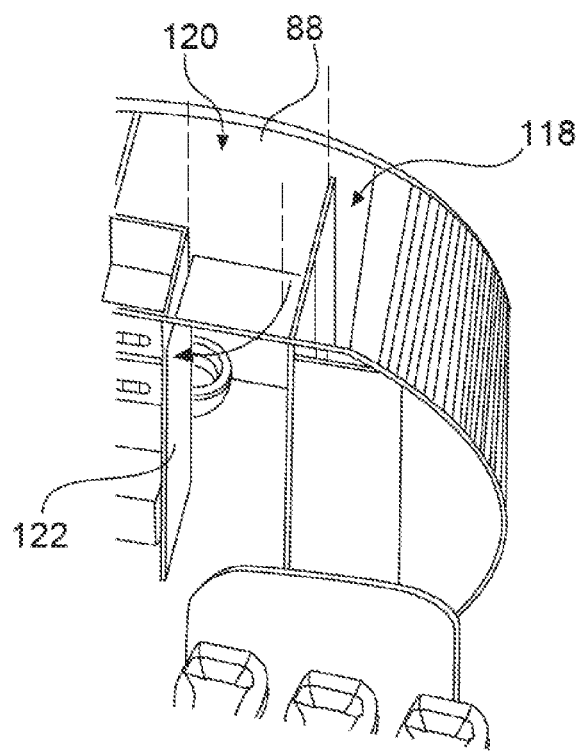

In order to connect the two toilet compartments 120 and 118 to form a joint toilet compartment, at first the first toilet compartment door 122 is opened outwards and away from the two toilet compartments 120 and 118 as indicated by an arrow in FIG. 9b. This takes place by means of a pivot movement of the first toilet compartment door 122 on a hinge axis 136 that is arranged on a delimitation wall of the first toilet compartment 120.

Figure 9C:
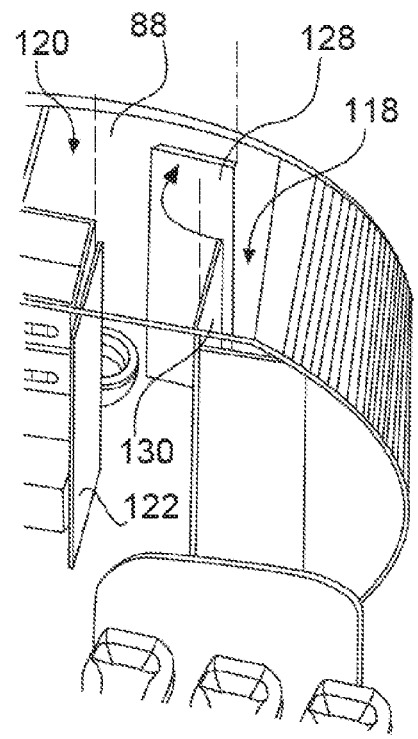

Subsequently, as shown in FIG. 9c, the first partition wall segment 128, after corresponding unlocking from a cabin floor and/or a cabin ceiling and/or the second partition wall segment 130, is moved on the hinge axis 132 towards the pressure bulkhead 88 so that an opening arises between the first toilet compartment 120 and the second toilet compartment 118. In this reached position it is particularly advantageous if the first partition wall segment 128 is locked, and consequently its position is determined until its renewed unlocking.

Figure 9D:
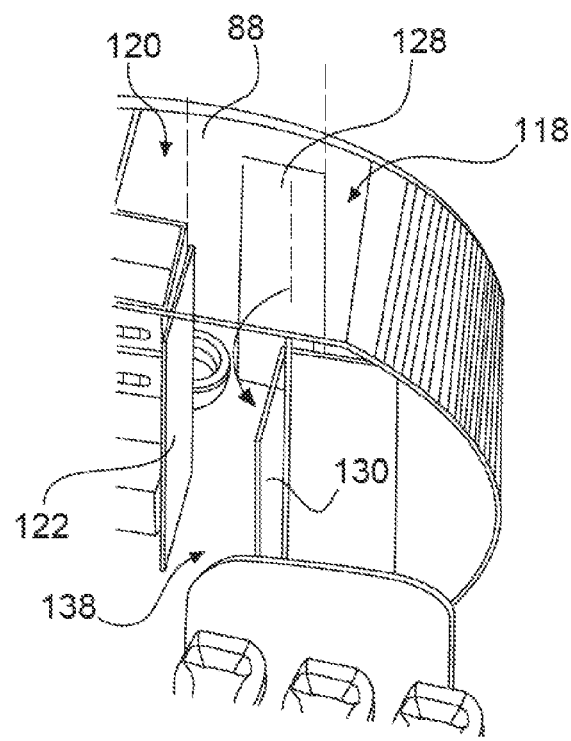
Figure 9E:
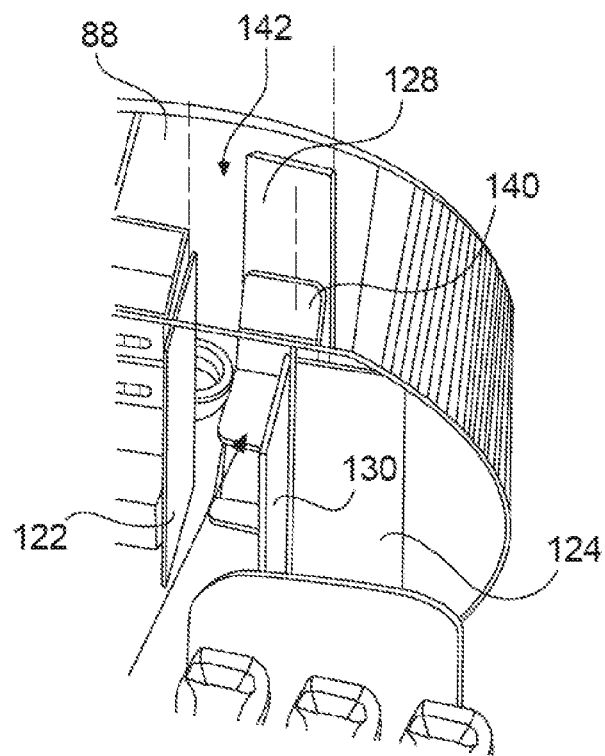

In a further step the second partition wall segment 130, as shown in FIG. 9d, after unlocking from the cabin floor and/or from the cabin ceiling, is moved on the hinge axis 134 by approximately 180° towards the outside so that as a consequence the first toilet compartment 118 and the second toilet compartment 120 are completely inter-connected. In this position an opening 138 arises, through which, for example, a person sitting in a wheelchair 140 can effortlessly be moved, or move, into the now joint toilet compartment 142 (FIG. 9e).

Figure 9F:
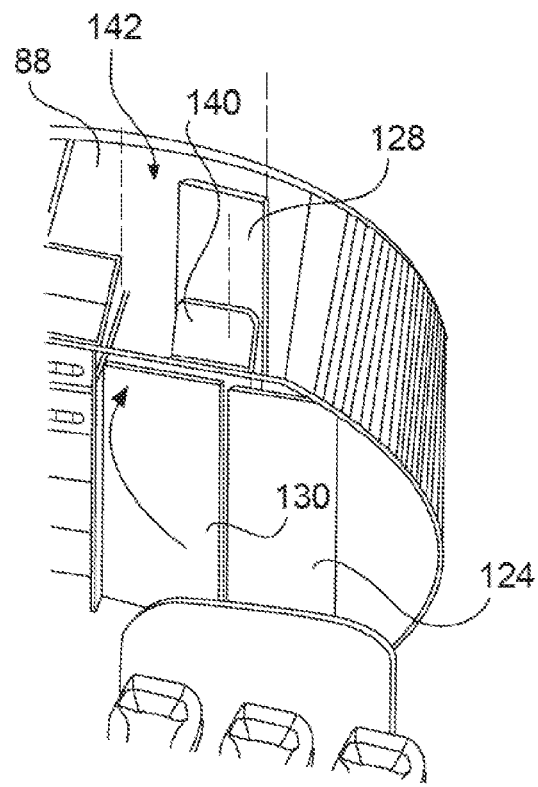

After subsequent pivoting of the second partition wall segment 130 on the hinge axis 134 towards the opening 138, separation of the joint toilet compartment 142 towards the outside takes place (FIG. 9f). The second partition wall segment 130 is correspondingly used as the new entrance door to the joint toilet compartment 142. Furthermore, in this arrangement the first toilet compartment door 122 forms a sidewall of the entrance region to the joint toilet compartment 142, which sidewall is arranged so as to be parallel to the direction of extension of the first toilet compartment 118, of the second toilet compartment 120, and at a distance from the second toilet compartment 120.

In the shared toilet compartment 142 there is now adequate space for moving from the wheelchair 140 to a toilet seat or the like. If required, the joint toilet compartment 142 can be converted back to form two separate toilet compartments 118 and 120.

It is thus evident to the average person skilled in the art that the partition wall segments 128 and 130 as well as the first toilet door 122 comprise at least one locking mechanism so that these elements can be locked in the various positions shown in FIGS. 9a to 9f.

Likewise it should be ensured that the new toilet compartment door 130 after conversion to form a larger toilet compartment is locked from the inside so as to prevent access by third parties. However, if required, it should be possible for a flight attendant to unlock at least one of the two toilet compartment doors 122, 124 from the outside when help is required.

Figure 10:
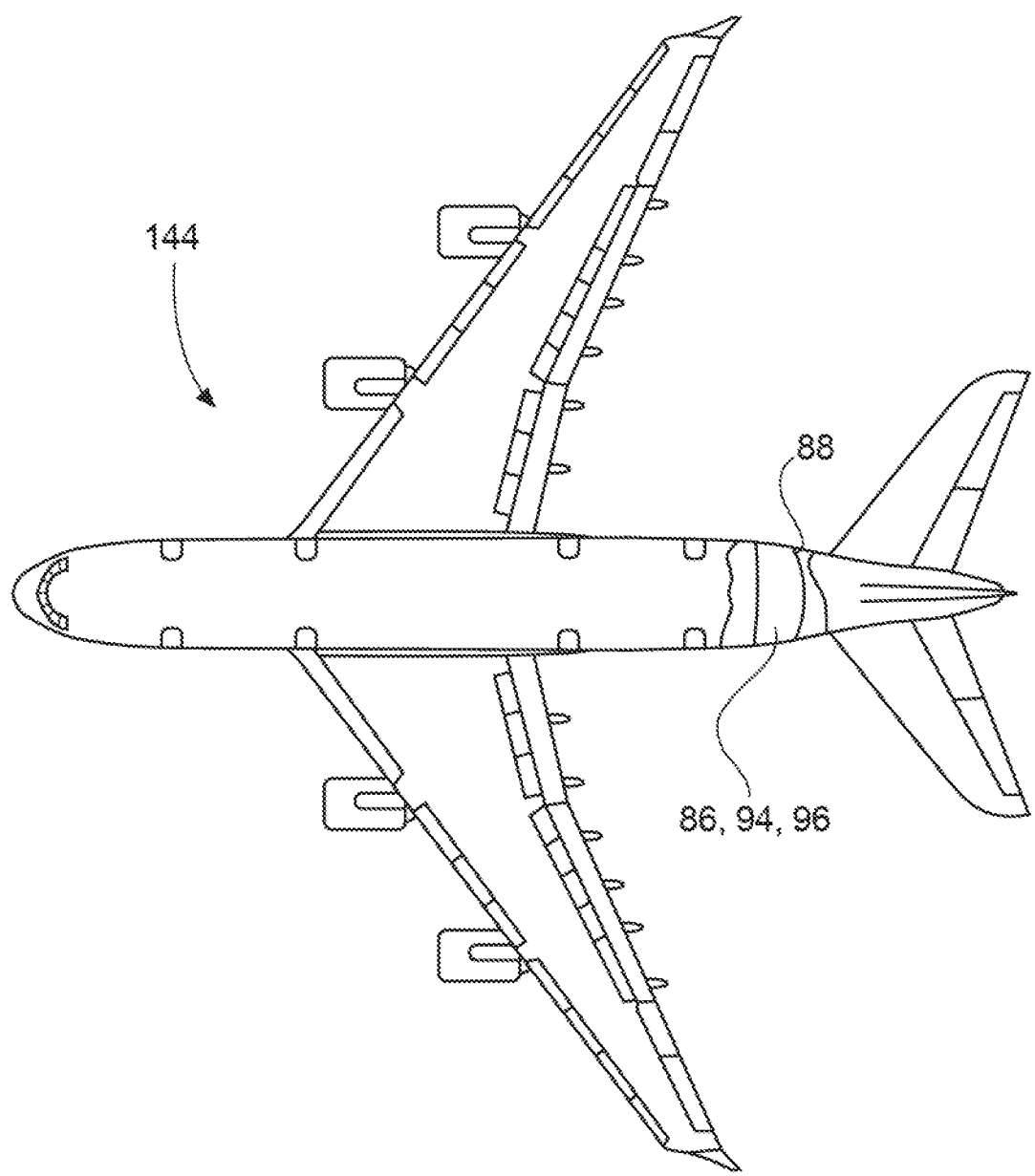
FIG. 10 shows an aircraft with a cabin and a cabin segment according to the invention, which cabin segment is arranged therein.

Finally, FIG. 10 shows an aircraft 144 with a passenger cabin in which as an example there is a cabin segment 86, 94 or 96 according to the invention.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS

2 Lateral segment module
4 Outer lateral face
6 Inner lateral face
8 First parking space
10 Second parking space
12 Base
14 Cabin trolley
16 Wheelchair
18 Storage compartment
20 Storage compartment
22 Intermediate floor/work surface
24 Storage compartment
26 Central module
28 First lateral face
30 Second lateral face
32 Access opening
34 Toilet compartment
36 Door
38 Toilet
40 Base
42 Parking space
44 Compartment
46 Cabin attendant seat
48 Central module
50 Toilet compartment
52 Urinal
54 Parking space
56 Compartment
58 Central module
60 Parking space
62 Parking space
64 Parking space
66 Intermediate floor
67 Oven
68 Storage compartment
69 Flap
70 Headrest part
72 First lateral segment module
74 Outer lateral face
76 Toilet compartment
78 Toilet
80 Inner lateral face
82 Side
84 Hinge
86 Cabin segment
88 Pressure bulkhead
90 Wall
92 Projection
94 Cabin segment
96 Cabin segment
98 Dividing curtain
100 Cabin monument
102 Curtain rod
104 Cabin attendant seat
106 Partition wall
108 First lateral segment module
110 Second lateral segment module
112 First lateral segment module
114 Second lateral segment module
116 Second lateral segment module
118 Toilet compartment
120 Toilet compartment
122 First toilet compartment door
124 Second toilet compartment door
126 Partition wall
128 First partition wall segment
130 Second partition wall segment
132 Hinge axis
134 Hinge axis
136 Hinge axis
138 Opening
140 Wheelchair
142 Joint toilet compartment
144 Aircraft

The invention claimed is:

1. A modular cabin segment for a vehicle, comprising:
a first lateral segment module accommodating a first toilet arrangement with at least one first toilet compartment;
a second lateral segment module; and
at least one central module,
wherein an outer lateral face of the first segment module and of the second lateral segment module are configured to snugly fit in each case to an inner wall of a cabin of the vehicle so as to correspond to the inner wall,
wherein the second lateral segment module is a galley module,
wherein the at least one central module is arranged between the first lateral segment module and the second lateral segment module and accommodates a second toilet arrangement with at least one second toilet compartment adjacent the first toilet compartment, and
further comprising a partition wall arranged between the first toilet compartment and the adjacent second toilet compartment, wherein the partition wall is movably held and is configured to be brought to an opening position in which separation between the first toilet compartment and the second toilet compartment is canceled,
wherein the partition wall comprises first and second individual partition wall segments that are movably held, and
wherein the first partition wall segment is configured to be folded to a first sidewall of the first toilet compartment, while the second partition wall segment is configured to be pivoted into a region that is not situated in the first toilet compartment or in the second toilet compartment.

2. The cabin segment of claim 1, wherein at least one of the modules comprises at least one cabin attendant seat supported on the at least one module on one side so that the at least one cabin attendant seat is pivotable on an axis.

3. The cabin segment of claim 1, wherein a cabin attendant seat is supported on the at least one module in such a manner that the cabin attendant seat is pivotable either in front of a toilet arrangement or in front of a storage compartment.

4. The cabin segment of claim 1, wherein the second lateral segment module comprises at least one parking space for a cabin trolley and at least one storage compartment for accommodating objects.

5. The cabin segment of claim 4, wherein the at least one parking space comprises dimensions that allow to accommodate a wheelchair in a folded state thereof.

6. The cabin segment of claim 1, wherein the second toilet arrangement is arranged on a side of the central module, which side faces the first toilet arrangement.

7. The cabin segment of claim 1, wherein the second toilet arrangement extends across the entire width of the at least one central module.

8. The cabin segment of claim 1,
wherein the at least one central module comprises at least one parking space for at least one cabin trolley and at least one storage compartment, and
wherein a cabin attendant seat is supported on the at least one central module in such a manner that the cabin attendant seat is pivotable in front of an access opening of the second toilet arrangement.

9. The cabin segment of claim 1, wherein at least part of the central module and the lateral segment module are interconnected in the form of an enlarged lateral segment module.

10. The cabin segment of claim 1, wherein the second toilet arrangement has at least one toilet compartment comprising a urinal, said toilet compartment being arranged in a transverse direction beside the at least one storage compartment.

11. The cabin segment of claim 1, wherein a direction of extension of the first toilet compartment and a direction of extension of the second toilet compartment are arranged so as to be essentially perpendicular to each other.

12. A cabin for a vehicle, comprising at least one cabin segment, the cabin segment comprising:
a first lateral segment module accommodating a first toilet arrangement with at least one first toilet compartment;
a second lateral segment module; and
at least one central module,
wherein an outer lateral face of the first segment module and of the second lateral segment module are configured to snugly fit in each case to an inner wall of a cabin of the vehicle so as to correspond to the inner wall,
wherein the second lateral segment module is a galley module,
wherein the at least one central module is arranged between the first lateral segment module and the second lateral segment module and accommodates a second toilet arrangement with at least one second toilet compartment adjacent the first toilet compartment, and
further comprising a partition wall arranged between the first toilet compartment and the adjacent second toilet compartment, wherein the partition wall is movably held and is configured to be brought to an opening position in which separation between the first toilet compartment and the second toilet compartment is canceled,
wherein the partition wall comprises first and second individual partition wall segments that are movably held, and
wherein the first partition wall segment is configured to be folded to a first sidewall of the first toilet compartment, while the second partition wall segment is configured to be pivoted into a region that is not situated in the first toilet compartment or in the second toilet compartment.

13. A vehicle comprising a cabin, the cabin comprising:
at least one cabin segment, the cabin segment comprising:
a first lateral segment module accommodating a first toilet arrangement with at least one first toilet compartment;
a second lateral segment module; and
at least one central module,
wherein an outer lateral face of the first segment module and of the second lateral segment module are configured to snugly fit in each case to an inner wall of a cabin of the vehicle so as to correspond to the inner wall, and
wherein the second lateral segment module is a galley module,
wherein the at least one central module is arranged between the first lateral segment module and the second lateral segment module and accommodates a second toilet arrangement with at least one second toilet compartment adjacent the first toilet compartment, and
further comprising a partition wall arranged between the first toilet compartment and the adjacent second toilet compartment, wherein the partition wall is movably held and is configured to be brought to an opening position in which separation between the first toilet compartment and the second toilet compartment is canceled,
wherein the partition wall comprises first and second individual partition wall segments that are movably held, and
wherein the first partition wall segment is configured to be folded to a first sidewall of the first toilet compartment, while the second partition wall segment is configured to be pivoted into a region that is not situated in the first toilet compartment or in the second toilet compartment.

14. The vehicle of claim 13, wherein the vehicle is an aircraft.

* * * * *